United States Patent
Reichhelm

[15] 3,667,436
[45] June 6, 1972

[54] FUEL GASIFICATION FOR INTERNAL COMBUSTION ENGINES

[72] Inventor: Robert Reichhelm, 155 LePore Drive, Lancaster, Pa. 17602

[22] Filed: Jan. 14, 1970

[21] Appl. No.: 2,880

[52] U.S. Cl. .................. 123/119 A, 123/122 R, 123/133, 431/115
[51] Int. Cl. ............. F02m 25/06, F02m 17/18, F02m 31/08
[58] Field of Search ............ 123/122 C, 122 E, 122 F, 122 A, 123/122, 133, 119 A, 179 H, 180 E, 180 EH, 3, 141; 431/115

[56] References Cited

UNITED STATES PATENTS

| | | | |
|---|---|---|---|
| 1,381,434 | 6/1921 | Rowlands | 123/122 C |
| 1,619,050 | 3/1927 | Wirrer | 123/122 A |
| 2,197,236 | 4/1940 | Bowen et al. | 123/133 |
| 2,884,917 | 5/1959 | Quinby | 123/133 |
| 3,306,273 | 2/1967 | Dolphin | 123/133 |
| 3,380,442 | 4/1968 | Johnson | 123/119 A X |
| 3,421,485 | 1/1969 | Fessenden | 123/119 A |

*Primary Examiner*—Al Lawrence Smith
*Attorney*—Bryan, Parmelee, Johnson & Bollinger

[57] ABSTRACT

A system and method is provided adapted to utilize low-grade liquid fuel in an internal combustion engine providing a gasification chamber and a method for introducing the low-grade liquid fuel into the gasification chamber while at the same time directing a portion of the engine exhaust products to the gasification chamber for direct mixture with the liquid fuel to gasify the liquid fuel and thereafter conducting the fuel to the engine system. There is also provided a system for additional indirect heating of the liquid fuel by circulating a portion of the engine exhaust products to the gasification chamber without direct mixture with the fuel, and auxiliary heat to provide gasification of the liquid fuel on start-up. Air may also be introduced into the gasification chamber and, preheated.

9 Claims, 1 Drawing Figure

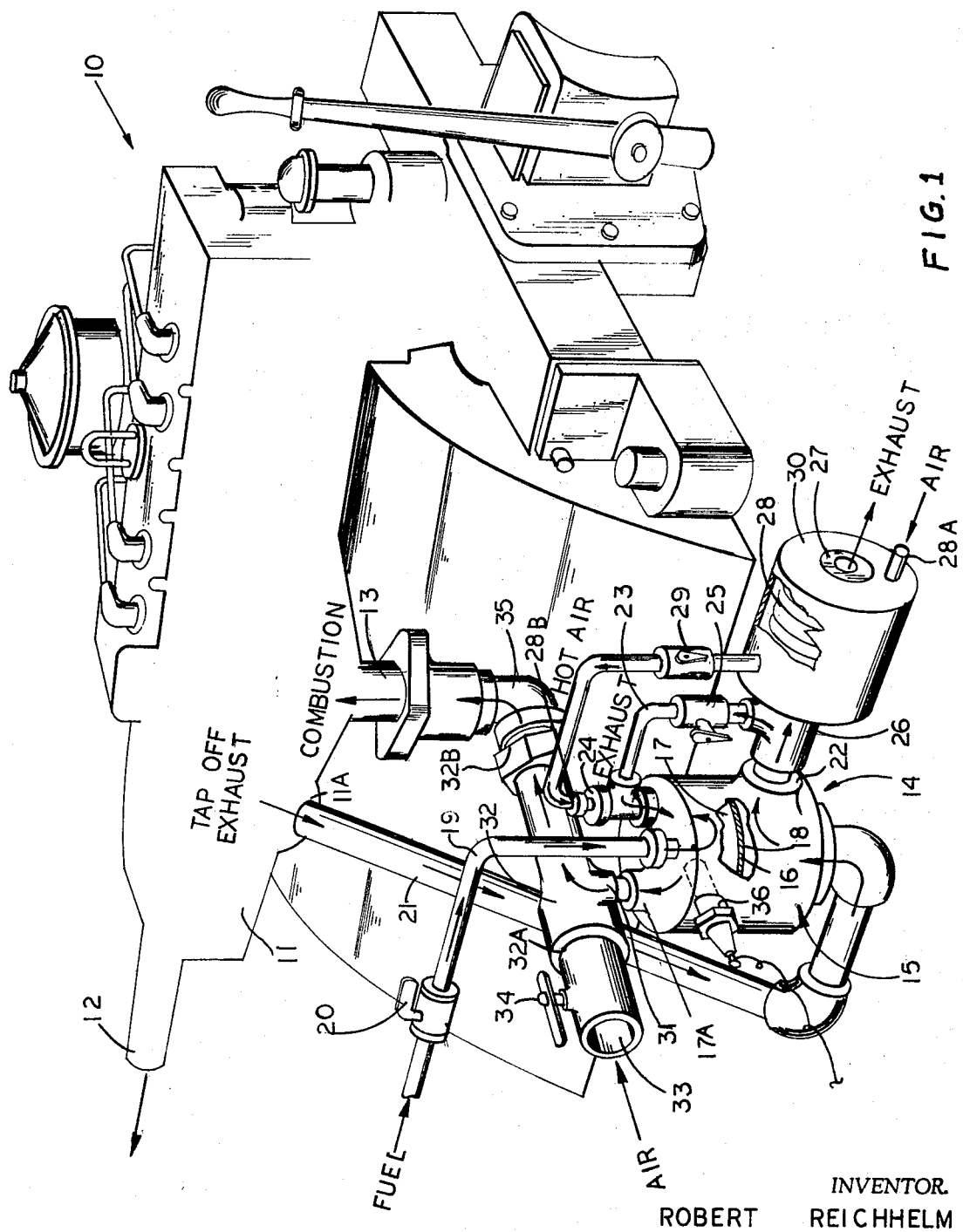

FUEL GASIFICATION FOR INTERNAL COMBUSTION ENGINES

PROBLEM AND PRIOR ART

Heretofore fuel in a liquid state has been used to operate conventional internal combustion engines. The fuel mixture was effected either by atomization of the liquid fuel into minute liquid droplets and combining the required air therewith as occassioned in conventional carburetors, or by injecting the liquid fuel and air mixture directly into the cylinders by various known fuel injectors. In multi-cylinder engines equal distribution of fuel to the respective cylinders by these known fuel supply means was difficult, if not impossible to achieve. This was because it was extremely difficult to control the amount of atomized fuel or fuel droplets contained in the air being mixed therewith. As a result some cylinders would receive a rich mixture whereas others would receive a lean mixture. For this reason the smoothness of engine operation was adversely affected.

Also in the past is was generally impossible to satisfactorily operate an internal combustion engine on low grade fuel such as fuel oil. However, efforts have been made to discover a satisfactory manner in which to utilize low grade fuels e.g. fuel oil, to operate internal combustion engines. Some success has been achieved in running gasoline engines with fuels such as kerosene or light fuel oil, e.g. No. 2 oil. However, all of these known efforts required the use of gasoline on start-up, and thereafter switching over to the lower grade fuels when the engine became hot.

OBJECTS

An object of this invention is to provide for the gasification of liquid fuel prior to the mixing with combustion air and distribution of the fuel mixture to the cylinders of an internal combustion engine.

Another object is to provide for the gasification and carburetion of low grade fuels, such as liquid fuel oil, for use in operation on internal combustion engines.

Another object is to provide for the gasification of liquid fuel for operating an internal combustion engine, and utilizing the waste heat of the hot engine exhaust gases to effect the gasification of the liquid fuel.

Another object is to provide for use with an internal combustion engine a carburetor for effecting the gasification of liquid fuel by direct heat transfer between the waste heat of the hot engine exhaust gases and the liquid fuel.

Another object of this invention is to effect the gasification of liquid fuel for operating an internal combustion engine by mixing the liquid fuel with predeterminate amounts of preheated air and hot engine exhaust gases whereby the heat of both the preheated air and hot engine exhaust gases directly mixes with and effects gasification of the liquid fuel to form a homogeneous fuel mixture.

Another object of this invention is to provide for the gasification of liquid fuel prior to mixing with combustion air to form a substantially homogeneous fuel mixture.

Another object is to provide for the gasification and carburetion of liquid fuel in an internal combustion engine where the feed of the gasified fuel mixture to the respective cylinders of the engine is induced by the negative pressure resulting from operation of the engine.

BRIEF SUMMARY OF THE INVENTION

This invention is directed to a method and apparatus for effecting the gasification and carburetion of a liquid fuel to provide a homogeneous combustible fuel mixture for effecting the distribution of combustible fuel mixtures of uniform richness to the respective cylinders of a multi-cylinder, internal combustion engine, and/or for effecting the operation of internal combustion engines on fuels which are lower graded than gasoline. The invention contemplates utilizing in conjunction with an internal combustion engine a gasifying chamber in which liquid fuel is supplied in predetermined amounts. A portion of the hot engine exhaust gases is tapped off the engine manifold and directed into the gasifying chamber where it is intimately mixed with the liquid fuel therein. The waste heat of the hot exhaust gases is utilized to effect the gasification of the liquid fuel within the gasifying chamber. This is achieved by the exhaust gases raising the temperature of the liquid fuel to temperatures ranging between 600° and 1,000° F. The hot gaseous fuel mixture on leaving the gasifying chamber is mixed with predetermined amounts of combustion air to form a homogeneous combustible gaseous fuel mixture.

An auxiliary electrically energized heater is operatively associated with the gasifying chamber to supply the necessary heat to the liquid fuel to effect gasification thereof on start-up or cold start.

The gasification of the fuel is enhanced by having the hot engine exhaust gases externally heat the gasifying chamber prior to mixing with the liquid fuel within the chamber. Also preheated air may be introduced into the chamber to mix with the hot exhaust gases and gasifying fuel therein.

FEATURES

A feature of this invention resides in the provision of a method and apparatus wherein low grade fuel, e.g., fuel oil, can be utilized as a satisfactory fuel for operating internal combustion gasoline engines.

Another feature resides in the provision of a gasifying chamber operatively associated with the exhaust manifold of an internal combustion engine whereby the hot exhaust gases of the engine are utilized to effect the heating of the liquid fuel to transform it into a substantially gaseous state.

Another feature of this invention resides in the provision of a carburetor in which liquid fuel is gasified and mixed with predetermined amounts of hot engine exhausts and/or preheated air in proportional amounts to form a homogeneous fuel mixture.

Another feature of this invention is to provide the gasification chamber or carburetor with an electrically energized auxiliary heater for effecting the gasification of liquid fuel on start up of the engine.

Another feature of the invention resides in the provision that the method and apparatus permits operation of an engine on a multiplicity of fuels ranging from high octane aviation gas down through kerosene, jet fuel, diesel fuel and No. 2 fuel oil.

Other features and advantages will become more readily apparent when considered in view of the drawings and specification in which:

FIG. 1 illustrates a perspective view of the apparatus embodying the invention as applied to an internal combustion engine.

DETAILED DESCRIPTION

To improve the distribution of fuel of uniform richness to the respective cylinders of a multi-cylinder internal combustion engine and thereby improve the smoothness of operation of such engine, the present invention contemplates the transformation of liquid fuel into a substantially gaseous state to form a homogeneous gaseous fuel mixture for delivery to the respective cylinders of an internal combustion engine. Referring to the drawing, there is illustrated an internal combustion engine 10 of conventional construction, e.g. an automobile gasoline engine. For convenience the engine 10 is illustrated as a four cylinder in-line engine. However, it will be understood that the specific construction of the engine does not constitute any part of the invention except as hereinafter set forth. The engine 10 includes an exhaust manifold 11 communicating to an exhaust outlet 12, and a fuel mixture inlet 13 from which the fuel mixture is distributed to the respective engine cylinders.

Operatively associated with the engine 10 is a device 14 for effecting the gasification of the liquid fuel. In the illustrated embodiment the device 14 comprises a receptacle 15 in the form of an enclosure having a partition member 16 subdividing the receptacle 15 into a gasifying chamber 17 and a juxtapositioned heating chamber 18. A fuel line 19, connecting to a tank or reservoir of liquid fuel (not shown) supplies liquid fuel to the interior of the gasifying chamber 17. If desired a suitable valve or throttle means 20 is interposed in the fuel line 19 to proportion or control the liquid fuel flow to the gasifying chamber.

The liquid fuel within the chamber is gasified, i.e., raised to a temperature ranging between 600° and 1,000° F by heating the liquid fuel with the hot exhaust gases of the engine. This is attained by tapping a portion of the exhaust gases from the exhaust manifold 11 and delivering the tapped exhaust gases to the gasifying chamber 17 where the hot exhaust gases are intimately mixed with the gasifying fuel.

The receptacle 15 is connected to the manifold tap 11A by a first branch or conduit 21 which directs the exhaust gases to the heating chamber. The heat of the hot exhaust gases entering chamber 18 thus externally heats the bottom or partition 16 of the gasifying chamber 17. From the heating chamber 18 the exhaust gases exit at outlet 22 to which a second branch or conduit 23 is connected for directing the exhaust gases to the interior of the gasifying chamber through a Tee 24. A suitable control valve 25 is disposed in conduit 23 to control the flow of exhaust gases to chamber 17.

Connected to outlet 22 is an exhaust tap 26 and connected tap conduit 27 for bleeding off a portion of the exhaust gases flowing to the gasifying chamber 17 through branch 23. Coiled about the exhaust tap conduit 27 is a coil 28 having an inlet end 28A and an outlet end 28B connecting into the upper end of Tee 24. It will be understood that inlet end 28A is open to atmosphere or other source of air supply, and the outlet end 28B communicates with the interior of the gasifying chamber. Disposed in line 28B is a control valve or throttle 29 to control the air flow therethrough. About coil 28 there may be disposed a casing or housing 30. The structure described within casing 30 thus defines an air heater in which air flowing through coil 28 is heated by indirect heat transfer by the flow of hot exhaust gas flowing through the tap conduit 27A and exhausting, e.g. to atmosphere.

Depending upon the speed of the engine, the temperature of the exhaust gases being tapped off the manifold 11 at 11A ranges between 700° and 1,400° F.

As illustrated the hot exhaust gases are first used to externally heat the gasifying chamber 17 with a portion thereof being directly introduced into the gasifying chamber to cause the liquid fuel to reach temperatures ranging between 600° and 1,000° F, a state of substantial gasification. The remaining portion of the circulating exhaust gases tapped off at 26 is utilized to preheat the air in the air heater 30. The air thus heated may be introduced into the gasifying chamber 17 to function as cleansing air, and also to impart some heat to the gasifying fuel within chamber 17. The introduction of heated air into the gasifying chamber 17, it has been noted, tends to minimize residue by inhibiting cracking of the fuel. If cracking occurred, undesirable residue would tend to accumulate within the chamber 17. Thus the preheated air tends to keep the chamber 17 clean. Sufficient exhaust gases should be tapped off at 26 so as to insure heating of the air in air heater 30 to a temperature in excess of 600° F. This is to prohibit any condensation of the gasifying fuel within chamber 17 when the heated cleansing air is introduced into the chamber to mix with the fuel.

From the structure thus described the liquid fuel introduced into the gasifying chamber is intimately mixed with the hot exhaust gases of the engine and highly heated thereby to form a homogeneous fuel mixture. When heated air is also introduced into chamber 17, it too becomes mixed with the gasified fuel. By proportioning the respective flow of liquid fuel, exhaust gases and heated air by valves 20, 25 and 29 respectively, the homogeneous make-up of the gasified fuel mixture can be controlled.

Formed in the top of the gasifying chamber 17 is an outlet 17A to which there is connected a distributing means 31 by which the gasified fuel mixture formed in chamber 17 is conducted to the fuel inlet 13 of the engine. As shown the distributing means includes a mixing Venturi 32 wherein the gasified fuel mixture formed in the gasifying chamber is mixed with the necessary air to form the combustible fuel mixture that is delivered to the respective cylinders of the engine 10. The Venturi mixer 32 may comprise a standard air to gas mixer. Connected to the inlet end 32A of the Venturi mixer 32 is an open conduit 33 through which combustion air is sucked. Disposed in conduit 33 is a valve or butterfly 34 to control the air flow therethrough. The outlet end 32B of the Venturi mixer 32 connects to the fuel line 35 connecting to the fuel inlet 13.

In order to provide a cold start up means, an auxiliary heater is provided with the gasifying chamber 17. In the illustrated embodiment the auxiliary heater is illustrated as a glow plug 36 projecting into the chamber 17. The plug is connected to a suitable source of an electrical supply as e.g. a 6, 12 or 24 Volt D.C. source, when the system is used in a car or the like. Connected in circuit with the heater 36 is a suitable switch so that the heater can be energized at will. When the system herein described is used in a car, the switch may be positioned on the dash board adjacent the ignition, or may be built into the ignition. It will be understood that a band type heater or other suitable heating means may be employed in lieu of the glow plug 36 to effect cold starting as will be hereinafter described.

The operation of the apparatus described is as follows:

To start the engine, the switch (not shown) for energizing the glow plug 36 is actuated. When actuated, the glow plug or heater 36 is energized and heats the liquid fuel being introduced into the gasifying chamber 17 through fuel line 19. As the temperature within chamber 17 builds up to 600° F the liquid fuel commences to gasify. As the engine is turned over, as by stepping on a starter, the negative pressure caused within the engine thereby causes a portion of the gasified fuel to be withdrawn from chamber 17 and combined with combustion air being sucked in through conduit 33 of the Venturi mixer 32 to form a homogeneous gas or fuel mixture. As this mixture is delivered to the respective cylinders of the engine and is fired, the engine is started.

When the engine has started operating, the heater is de-energized, and the hot exhaust gases resulting from the running of the engine are used as the heat source for continuing the gasification of the liquid fuel within chamber 17. Due to the negative pressures developed by the running of the engine a portion of the hot exhaust gases is sucked out from the manifold tap 11A and directed through conduit 21 to the heating chamber 18 to supply some external heat to chamber 17. From chamber 18 the exhaust gases flow through branch 23 to the higher pressure area within the gasifying chamber where they are intimately mixed with the liquid fuel, the heat of the exhaust gases effecting the gasification of the liquid fuel by direct heat transfer. The portion of the exhaust gases bled off at 26 is utilized in the heater 30 to the heat cleansing air flowing through coil 28.

With the construction described and the method of effecting the gasification of liquid fuel herein set forth, it has been discovered that low grade fuel such as No. 2 fuel oil can be satisfactorily utilized to operate a standard internal combustion engines which heretofore could only satisfactorily operate on gasoline. Also the device 14 described permits the operation of an engine on a multiplicity of fuels ranging from high octane aviation fuel down through kerosene, jet fuel, diesel fuel and fuel oil.

Smoothness of engine performance results in that a homogeneous fuel mixture of uniform richness can be supplied to the respective cylinders of a multi-cylinder engine. By effecting gasification of the liquid fuel, the fuel can be more intimately mixed with the necessary combustion air to effect more efficient combustion with resulting economy of fuel.

Also when the structure described is used to operate an engine on fuel oil, the engine can be started and operated on fuel oil alone. Thus gasoline is not needed on start-up, as was heretofore required.

While the invention has been described with respect to a particular embodiment thereof, it will be readily appreciated and understood that variations and modifications may be made without departing from the spirit or scope of the invention.

What is claimed is:

1. A system adapted to utilize a low-grade liquid fuel in an internal combustion engine including,
   an internal combustion engine having an exhaust manifold and a fuel inlet,
   a gasification chamber connected to said engine for effecting the transformation of said liquid fuel to a gaseous fuel prior to the distribution of said fuel to said fuel inlet,
   a fuel conduit connected to said chamber for introducing liquid fuel into said chamber in predetermined amounts,
   exhaust conducting means connected between said exhaust manifold and said chamber for directing a portion of said engine exhaust into said chamber for direct mixture with said liquid fuel where the heat of said exhaust is utilized to effect gasification of said liquid fuel,
   means for connecting said chamber to said fuel inlet for directing the gasified fuel from said chamber to said fuel inlet,
   means disposed within said last-named connecting means for permitting combustion air to mix with said gasified fuel to form a combustible mixture as said gasified fuel is directed to said inlet.

2. The system of claim 1 including a preheating chamber adjacent said gasification chamber
   said exhaust conducting means having a first branch connecting the exhaust manifold of said engine to said preheating chamber for preheating said gasification, and a second branch connecting said preheating chamber to said gasification for directing the exhaust gases directly to said gasification to intimately mix with and gasify said liquid fuel by direct heat transfer therebetween.

3. The system of claim 2 including an air preheater operatively connected to said gasification whereby a portion of the exhaust gases directed to said gasifying means is utilized to preheat air,
   and means directing said preheated air to said gasification to intermingle and impart heat to said liquid fuel within said chamber.

4. The system of claim 3 including an air preheater means connected to said second branch
   whereby a portion of the exhaust gases flowing therethrough is tapped to supply heat to said air heater means,
   and a hot air line connecting said air preheater to said gasification for directing the preheated air to said gasification.

5. The system of claim 2 including an auxiliary heater for imparting heat to said gasification to effect gasification of said liquid fuel on start up.

6. A carburetor for use with an internal combustion engine having an exhaust manifold and a fuel inlet, said carburetor being capable of using low-grade liquid fuel and effecting the gasification thereof prior to the distribution of said fuel to said engine,
   said carburetor means including
   gasification chamber,
   a fuel conduit connected to said chamber for introducing liquid into said chamber in predetermined amounts,
   an exhaust conduit connected between said exhaust manifold and said gasification chamber,
   said exhaust conduit being connected between said exhaust manifold and said gasification chamber for direct mixing with said fuel,
   an air preheater,
   said air preheater including a tap conduit off said exhaust conduit for tapping off a portion of the exhaust gases flowing therethrough,
   an air heating coil disposed in heat transfer relationship about said tap conduit,
   an air line connecting the outlet of said air preheater to said gasification chamber,
   means disposed in said exhaust conduit means and hot air line to control the flow of the respective heated gases flowing therethrough,
   a fuel conductor for directing the gasified fuel mixture from said gasification chamber to said engine fuel inlet,
   a combustion air supply disposed in communication with said fuel conductor, and means disposed within said fuel conductor for mixing combustion air with said gasified fuel mixture to form a combustible fuel mixture, said means utilizing the negative pressure developed by the engine.

7. The carburetor of claim 6 including an auxiliary heater for imparting heat to said liquid fuel within said gasification chamber for effecting the gasification of said liquid fuel on start up.

8. The carburetor of claim 6 including a heating chamber juxtaposed adjacent said gasification chamber, and
   said exhaust conduit serially flowing a portion of the exhaust through said heating chamber and to said gasification chamber whereby said exhaust gases mix with and heat said liquid fuel to form a gaseous mixture.

9. A method of effecting the gasification and carburetion of a low-grade liquid fuel to provide a gaseous combustible fuel mixture to an internal combustion engine comprising the steps of:
   supplying predetermined amounts of liquid fuel to a gasification chamber,
   effecting the gasification of said liquid fuel within said chamber by mixing therewith hot engine exhaust gases,
   mixing preheated air with the gasified fuel mixture within said gasification chamber wherein the amount of air is insufficient to support combustion within said chamber,
   mixing with said fuel mixture externally of said chamber predetermined amounts of combustion air to form a combustible gaseous fuel mixture, and
   directing the gasified fuel and combustion air mixture to the cylinders of an engine by means of the negative pressure developed by the engine.

* * * * *